United States Patent [19]

Lahne et al.

[11] Patent Number: 4,998,583
[45] Date of Patent: Mar. 12, 1991

[54] HEAT TRANSFER EQUIPMENT

[75] Inventors: Ulrich Lahne, Deisenhofen; Ulrich Hildebrandt, Pullach; Max Braeutigam, Seeon, all of Fed. Rep. of Germany

[73] Assignee: Linde Aktiengesellschaft, Wiesbaden, Fed. Rep. of Germany

[21] Appl. No.: 386,078

[22] Filed: Jul. 28, 1989

[30] Foreign Application Priority Data

Jul. 28, 1988 [DE] Fed. Rep. of Germany ....... 3825724

[51] Int. Cl.$^5$ ..................... B01J 8/02; B65D 88/74; F28D 1/04
[52] U.S. Cl. .................................... 165/163; 165/157; 165/920; 422/201; 422/213; 422/140; 422/146
[58] Field of Search ................... 165/163, 157, 920; 34/168, 169, 177; 422/146, 145, 201, 213, 140

[56] References Cited

U.S. PATENT DOCUMENTS

| | | | |
|---|---|---|---|
| 3,666,423 | 5/1972 | Muenger | 165/157 |
| 3,796,547 | 3/1974 | Muenger | 165/157 |
| 4,063,589 | 12/1977 | Battock | 165/163 |
| 4,636,365 | 1/1987 | Link et al. | 422/201 |

FOREIGN PATENT DOCUMENTS

| | | | |
|---|---|---|---|
| 0077729 | 4/1983 | European Pat. Off. | 165/163 |
| 2736489 | 2/1979 | Fed. Rep. of Germany | 165/163 |
| 1290952 | 3/1961 | France | 165/163 |
| 226059 | 8/1985 | German Democratic Rep. | 165/163 |
| 296844 | 8/1963 | Netherlands | 165/163 |
| 623100 | 8/1976 | U.S.S.R. | 165/163 |
| 574594 | 9/1977 | U.S.S.R. | 165/163 |
| 970098 | 9/1964 | United Kingdom | 165/163 |
| 1280453 | 7/1972 | United Kingdom | 165/163 |

Primary Examiner—John Ford
Attorney, Agent, or Firm—Millen, White & Zelano

[57] ABSTRACT

Heat transfer equipment is provided having a chamber adapted to contain a bed of free-flowing granular material and a plurality of spirally wound cylindrical tube coils nested together which extend concentrically around a centrally positioned tube collector. Each tube coil is wound on a cylindrical surface having an axis coinciding with the longitudinal axis of the chamber. The tubes at least at the top end of the chamber emerge from the coil and remain on the cylindrical surface as they extend in a direction substantially parallel to the longitudinal axis. The tubes then bend about 90° and extend radially toward the longitudinal axis and connect to the centrally positioned tube collector. In the radial run, the tubes from different tube coils overlap one another on the top of the coils and extend radially over substantially the same outer surface of the tube coils. A retaining device adapted to be removed in sections is positioned below the tubes in the chamber.

22 Claims, 8 Drawing Sheets

HEAT TRANSFER EQUIPMENT

BACKGROUND OF THE INVENTION

The invention relates, in general, to heat transfer equipment which can be used in many types of chemical processes and, more particularly, to a shell and tube type of heat transfer device having a bed of free-flowing granular material with tubes imbedded therein, said tubes being coiled in concentric layers on cylindrical surfaces around an axis and being connected at both ends of the device to pipe collectors.

Heat transfer equipment having a bed with tubes imbedded therein are used to perform many chemical and adsorption processes. In this type of equipment, the substance to be treated, which may be a liquid and/or gas, flows through the bed, which may be a free-flowing catalyst or an adsorption material. A heat transfer medium flows through the tubes to either supply or remove heat by indirect heat exchange with the substance(s) flowing through the bed. From time to time, it is necessary to empty the equipment to perform maintenance work and/or to replace the free-flowing granular material. In such cases, a drain line may be attached to the bottom end of the container to remove the free-flowing granular material. Frequently, the granular material is caked together and does not drop out of the equipment. In many instances, the caked material near the bottom of the equipment holds back the granular material above it and prevents the gravity discharge of the bulk of the granular material.

In conventional heat transfer equipment having a shell and coil tube design and a bed of granular material, the tubes at the end of the bed extend to a tube sheet or collector either individually from the point at which they emerge from the coil or else the tubes are formed into bundles which pass into a tube sheet or header. It is usually difficult and often nearly impossible to mechanically empty the bed of granular material in this type of equipment because the top of the tube coils are covered in large part by the tubes running to the collector or tube sheet. Other problems occur in this type of equipment when the substance to be treated is a liquid. For example, if the liquid is introduced at the top of the equipment, the liquid flows through the bed in a relatively uncontrolled manner and is channeled along the tubes leading to the tube sheet. This results in a nonuniform distribution of the liquid in the bed and a lower efficiency of the unit.

SUMMARY OF THE INVENTION

A principal object of the present invention is to provide heat transfer equipment of the type described above which can be economically emptied.

Another object is to provide heat transfer equipment in which there is more even distribution of the liquid flowing throughout its cross-section.

Upon further study of the specification and appended claims, further objects and advantages of this invention will become apparent to those skilled in the art.

These objects of the invention are attained by a symmetrical, essentially cylindrical container having a longitudinal axis and a bed adapted to contain a free-flowing material, a plurality of spirally wound nested concentric tube coils, each of which is wound on a cylindrical surface around said longitudinal axis and are connected at both ends of the container to a centrally positioned tube collector, the tubes on at least the top end of the container emerge from the coil but remain on the same cylindrical surface of that coil and extend in a direction essentially parallel to said longitudinal axis.

As the tubes emerge from the coil and extend in a direction parallel to the longitudinal axis of the container, they remain on the cylindrical surface that describes the tube coil from which they emerged. Each of the tube coils is spaced from adjacent tube coils a distance at least equal to the outside diameter of the tubes. By keeping the inner spaces between adjacent tube coils substantially open and free of return lines, tools or other mechanical devices can be inserted during cleaning operations between the tube coils to remove caked granular material which may be stuck to the tubes.

In a preferred embodiment of the present invention, there is provided a symmetrical heat transfer device with a longitudinal axis having a chamber adapted to contain a bed of free-flowing material, said chamber containing a centrally positioned cylindrical tube collector having its axis coinciding with said longitudinal axis, a plurality of spirally wound cylindrical tube coils which are nested together and extend concentrically around the tube collector, each tube coil being formed from a plurality of tube bundles which are spirally wound together on a cylindrical surface so that each coil has the thickness of only one tube diameter, each tube bundle emerges at evenly spaced points around the circumference of the coil and then remains on its cylindrical surface as it extends parallel to said longitudinal axis, each tube bundle then bends about 90° and extends radially and connects with the tube collector, the radially extending tube bundles from the outer coils are superimposed on the radially extending tube bundles from inner coils.

In another preferred embodiment, the tubes emerging from the tube coils are formed into one or more assemblies or tube bundles. The tubes from each tube bundle become closely spaced after leaving the tube coil. The tube bundles emerging from the tube coils are evenly distributed in groupings over the circumference of the coils, leaving areas at the top of each tube coil which are not overlapped or covered by emerging tubes. Preferably, the tubes emerge from the coils at evenly distributed points about the periphery of coils. The bundles of tubes from various tube coils form from about 2 to 32, preferably 4 to 16, star-shaped areas. Between the tube bundles are relatively large areas of the top coil surfaces that are not overlapped by tubes. The size of this openly accessible area is dependent on the number of tubes per tube coil. According to the present invention, over 80% of the total top surface area of the coils can be open and accessible. In another embodiment, a reactor constructed according to the present invention has an openly accessible top area of about 90%.

Preferably, the framework that serves as a support structure for the tube coils inside the coil overlaps the same areas of the front surface of the coil as the tube bundles. The configuration of the tubes and support structure according to the invention provides large openly accessible areas on the top coil surfaces. Tools can be introduced into these openly accessible areas during cleaning operations. In larger equipment, personnel can enter the equipment after prolonged operations or breakdowns to assist in emptying the container such as, for example, when granular material is caked and adheres to the inside surfaces.

In equipment constructed according to the invention, there is enough space at the top end of the coil to install devices to control the cross-sectional distribution of a fluid passing through the bed. This is particularly advantageous when the fluid passing through the bed is a liquid or a two-phase mixture, and it is important to evenly distribute the liquid and optimize the amount of granular material making up the bed. In such cases, it is preferred that the tube bundles bend about 90° from a direction substantially parallel to the equipment's or chamber's longitudinal axis to a direction substantially perpendicular to the axis, i.e., radially relative to the longitudinal axis. It is also preferred that the bundles from different tube coils each overlap about the same points or areas on the side and top surfaces of the tube coils. In such an arrangement, the tubes do not overlap an area of the top surface of the coils substantially larger than where the tubes emerge from the coils.

In another preferred embodiment of the present invention, the tube collector includes an initial collector into which the tube bundles empty in a direction substantially parallel to a preferred axis, i.e., the longitudinal axis of the chamber containing the bed.

The initial collectors branch off radially from the central, somewhat cylindrically shaped portion of the tube collector. The initial collectors are preferably star shaped and uniformly distributed throughout the cross-section of the device. The tube bundles extending parallel to the longitudinal axis can be connected to the initial collectors without any substantial bending. With this construction, the initial collectors thus overlap substantially the same areas of the top surface of the coils as the emerging tubes, leaving large areas of the top coil surfaces openly accessible.

In a preferred embodiment, the axis of the equipment is substantially vertical and the tube collector at the top end of the equipment is part of a steam collecting drum. The equipment can be economically fabricated when parts of the tube collector are used as a steam collecting drum in which liquid and vaporous portions of the boiling heat exchange medium are separated from one another. This combination apparatus requires less volume and can save space because the special support structure for the steam collecting drum is eliminated.

In most cases, equipments of the type described herein have an upright design and the longitudinal axis of the equipment is substantially vertical. When emptying such equipment, it is desirable to loosen any caked, free-flowing granular material from the bottom. For this purpose, personnel equipped with suitable tools must often enter the equipment to reach the solidified and/or caked material directly from the inside. When this procedure is used, the danger exists that, after loosening caked material which blocks the discharge port, large amounts of uncaked material above the port will rapidly drop from the port and bury personnel. This danger is minimized in equipment constructed according to the present invention by the use of a retaining device which seals the underside of the bed at the points accessible from below. The retaining device which is impermeable to the free-flowing granular material, i.e., its openings or holes are smaller than the granular material in the bed, can be opened and/or removed in sections.

In this way, only small segments of the cross-section of the container are exposed for cleaning at any one time, while any granular material in the other segments of the cross-sectional area of the equipment is held back by the retaining device. During cleaning operations, only a relatively small amount of granular material is discharged through one segment, considerably reducing the danger of being buried.

Preferably, the retaining device comprises a support device with an attached screen. The openings in the screen are smaller than the particle size of the free-flowing granular material in the bed. In another preferred embodiment, the support device comprises perforated plates having perforations or holes that are about equal in diameter to the distance between the pipe layers. In yet another embodiment, the retaining device comprises a wire netting through which tools can be passed through during cleaning. In such cases, the wire netting must be reattached or replaced after the cleaning operation.

In another preferred embodiment, the holes in the support device have sieve plugs removably secured therein. Each plug may be individually secured by a snap ring, cotter pin, or the like which can be removed when cleaning the equipment. Despite these measures, the granular material can flow downwardly between the bundles of different tube layers. To prevent this, the retaining device preferably extends over the side and front surfaces of the tube bundles.

In another preferred embodiment of the invention, the retaining device has a substantially frustum shape with its axis coinciding with the axis of symmetry of the chamber containing the tubes. In such an apparatus, the portions of the free-flowing material that are not blocked will drain downwardly through the port at the bottom of the frustum. Removal of caked granular material can be facilitated by the use of tools both from above and below the frustum shaped retaining device.

Where the free-flowing granular material in the bed is drained through a central opening, the frustum tapers toward the bottom of the equipment. In such cases, the bottom opening of the frustum can have a cross-section which is sufficiently large to permit operators to enter the equipment. If the free-flowing granular material is drained through openings in the outside wall of the equipment, the diameter of the frustum may be smaller toward its top portion. The latter embodiment is especially advantageous when the substance to be treated is in the liquid state. The liquid may desirably be passed through a centrally positioned filter attached to the bottom end of the equipment.

Equipment constructed according to the present invention can be used to perform adsorption or chemical processes. In both cases, a reacting fluid is passed through the bed and a heating or cooling medium is passed through the tubes which extend through the bed. The reacting fluid is maintained at the desired temperature by heat exchange with a heating or cooling medium. In the case of an exothermic reaction, heat is removed by the cooling medium. If an endothermic process is involved, the heat is supplied by the heating medium to the reacting fluid to maintain the reaction.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire texts of all applications, patents and publications, if any, cited above and below, and of corresponding German application P 38 25 724.6, are hereby incorporated by reference.

BRIEF DESCRIPTION OF THE DRAWINGS

Various other objects, features and attendant advantages of the present invention will be more fully appreciated as the same becomes better understood when considered in conjunction with the accompanying drawings in which like reference characters designate the same or similar parts throughout the several views, and wherein.

DETAILED DESCRIPTION

The same parts of the equipment shown in the various figures have the same reference symbols in all of the drawings.

FIGS. 1-8 illustrate the inside of equipment according to the present invention. The outside shell or casing, the devices used for supplying and removing the substance to be treated, and the heat transfer medium are not shown in these figures since they are well known in the art.

Figure 1:
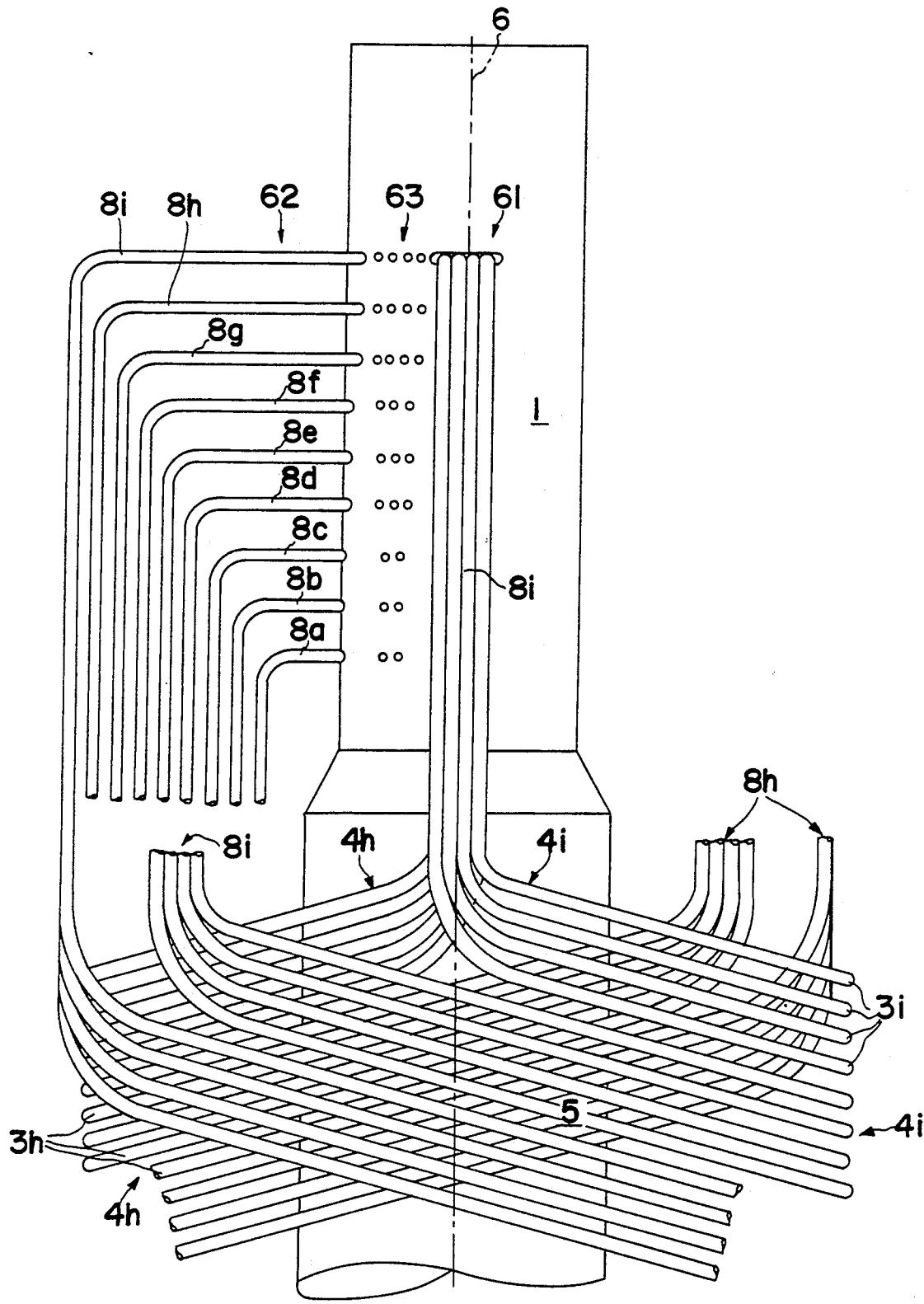
FIG. 1 is a side view of the inside of the equipment constructed according to the invention.

In the drawings herein, the preferred or longitudinal axis is vertical for all embodiments of the invention. FIGS. 1-7 show only the top portion of the equipment but the bottom portion may be similarly constructed. FIG. 1 diagrammatically represents the inside of an equipment constructed according to the invention with viewing perpendicular to longitudinal axis 6. The top end of coil 5 and top tube collector 1 are shown with three groups 61, 62 and 63 of tube bundles or assemblies 8a to 8i. In the group 61, facing the viewer, only the outermost assembly 8i can be seen. In group 62, illustrated on the left side of FIG. 1, in each case, one tube per tube bundle 8a to 8i is represented. In group 63, only the points at which the tubes attach to the tube collector are shown by circles and the transition of the tubes from coil 5 into outermost assembly 8i is represented. On the right side of FIG. 1 is shown two other groups which are indicated by truncated tube bundles 8h.

In the preferred embodiment, there are eight such groups of tube bundles evenly distributed around the periphery of the equipment. In this configuration, star-shaped partial areas of the top surface of the tube coils are overlapped by emerging tubes. FIG. 1 shows within coil 5 only the two outermost tube layers 4h and 4i of the total of nine coils. The remaining seven tube coils formed concentrically within tube layer 4i are visible in FIG. 1 only after they emerge from coil 5.

In tube layer 4i, the tube arrangement according to the invention is illustrated by way of the following example:

Tubes 3i, which are coiled further below with lateral distances of preferably about 1 tube diameter on a cylindrical surface 5 m in diameter, bend at the top end of coil 5 vertically upwardly. These tubes then extend substantially parallel to longitudinal axis 6 while remaining on the cylindrical surface of the coil from which they emerged. Tube bundles 8a to 8i are thus formed and the distances between the axis of every 2 adjacent tubes in a bundle decreases in each case by one tube diameter.

FIG. 1 illustrates on the side facing the observer the configuration of tubes 3i of outermost tube layer 4i. Tubes 3i extend inside coil 5 in a spiral, bend at the top end of coil 5 in an approximately vertical direction, and combine with three other similar tubes from other layers into tube bundle 8i which is made up of four tubes. In the vertical run, the tubes in bundle 8i are as close together as possible on the cylindrical surface, and preferably touch one another laterally. Tubes from tube coil 4h and those from the tube coils further inward (not shown) extend upwardly in bundles in a similar fashion.

The tube arrangement in FIG. 1 is further illustrated by the other group 63 of tube bundles. Above the vertical run, tube bundles 8i (outermost tube layer 4i) change direction about 90° into a substantially horizontal plane. The tube bundles 8i then extend radially relative to the axis of the chamber and tubes 3i connect to a substantially cylindrically shaped tube collector 1 (FIG. 1).

Tube bundle 8i overlaps a portion of the top surface of coil 5, leaving the remainder of the top surface openly accessible. The remaining tube bundles 8a to 8h run in their vertical as well as their horizontal sections directly below the horizontal section of tube bundle 8i and thus extend over the same portions of the top surface of coil 5, again leaving substantial areas of the top surface of the coils openly accessible.

Figure 2:
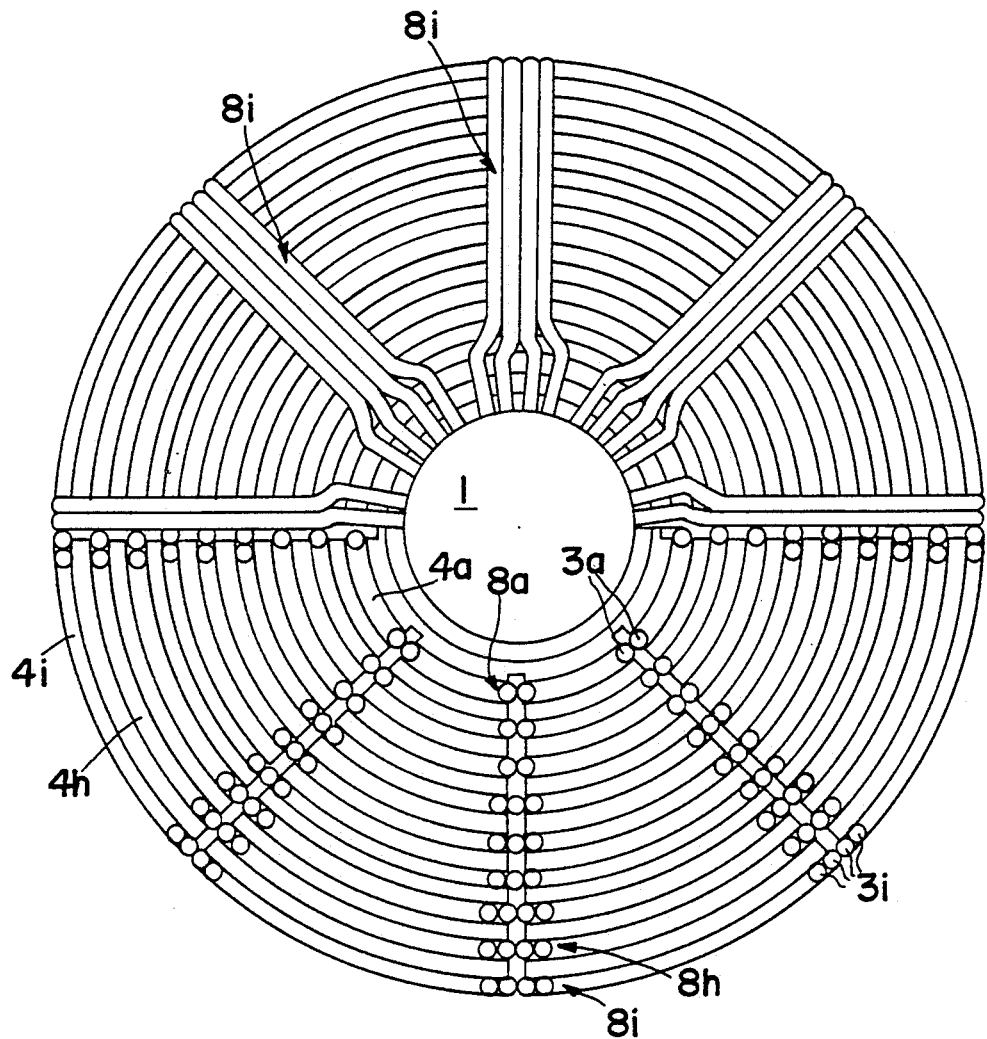
FIG. 2 is a composite diagrammatical sketch of two cross-sectional areas of the equipment of the present invention. The top half of the sketch is a top view of the end of the coils. The bottom half of the sketch is another sectional view taken perpendicular to the preferred longitudinal axis of the equipment.

FIG. 2 shows the concentric pattern of tube layers 4a to 4i. The upper half of FIG. 2 is a top view showing the radially extending horizontal sections of tube bundles 8i form the outermost tube layer 4i and the manner in which the tubes 8i are connected to tube collector 1. The remaining tube layers below the top layer shown in FIG. 2 (upper half) also extend radially to connect to tube collector 1. The bottom lower half of FIG. 2 represents, in horizontal section, the tube bundles 8a to 8i, as well as the individual tubes which are shown as circles. When the tube assemblies 8a to 8h emerge and extend radially in a horizontal plane, they lie directly below the radially extending tube bundle 8i. By using this configuration, a larger part of the top surface of the coil is open and not overlapped by the tubes.

Figure 3:
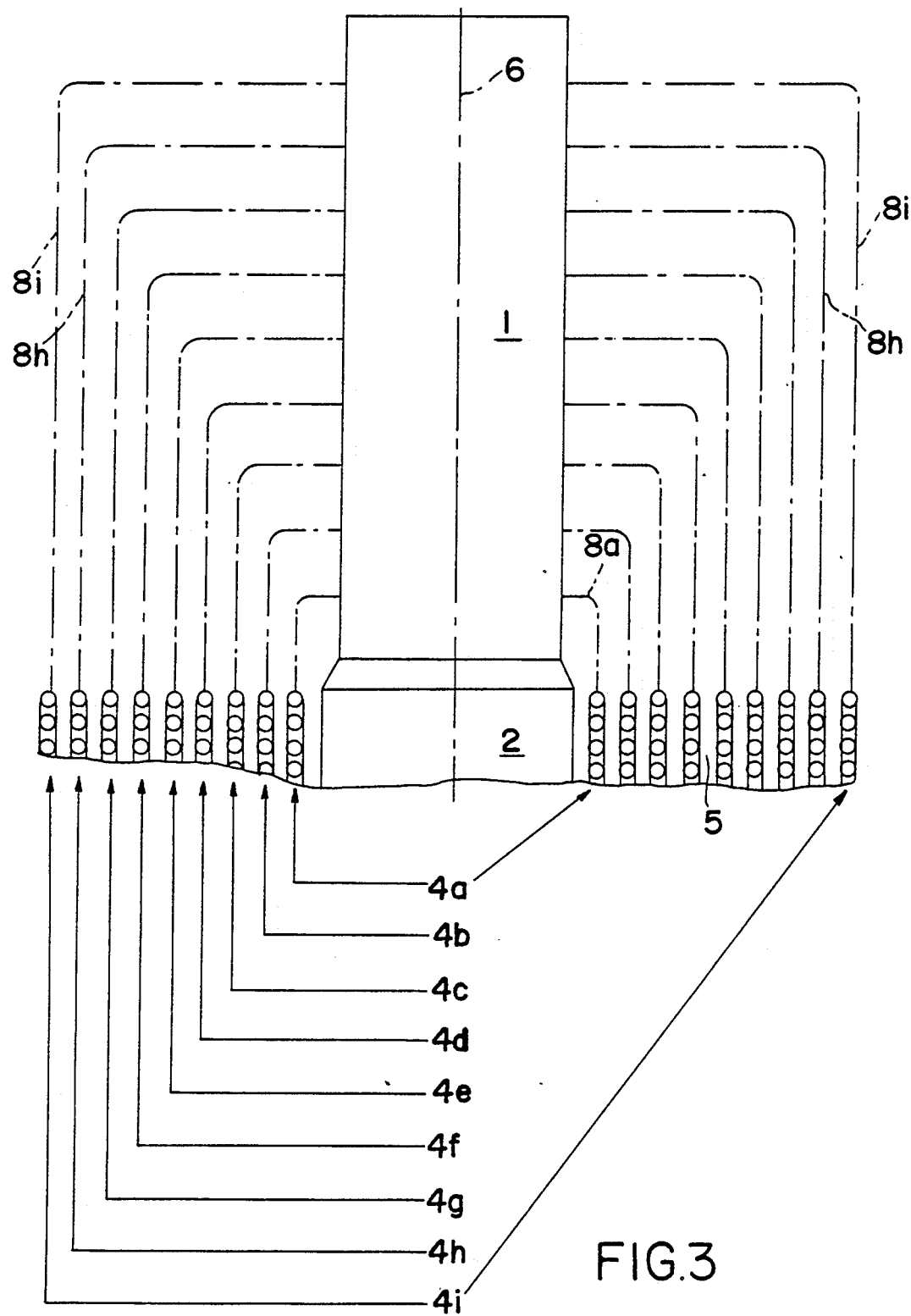
FIG. 3 is a sectional view taken parallel to the preferred longitudinal axis of the equipment, illustrating the configuration of the tubes.

FIG. 3 is a sectional view taken through an upper portion of the device. The tube coils 4a to 4i are shown extending around core tube 2 within coil 5. Above coil 5, the course of two opposite groups of tube bundles 8a to 8i (indicated by dotted lines), illustrate the vertical and radial pattern of tube bundles 8a to 8i.

In a preferred embodiment shown in FIGS. 1-3, the tubes first extend upwardly adjacent the cylindrical surface of tube coils and parallel to the preferred axis 6. Upon reaching the top layer, the tubes bend at 90° and extend radially inwardly to the tube collector 1. In another preferred embodiment, the tubes may extend in sections inclined, preferably at an angle of 45°, to the preferred longitudinal axis.

In another embodiment, the tube collector has a larger diameter than the core tube of the coil and can desirably taper or be rounded in the transition area where it connect to the core tube. In this embodiment, the inner tubes advantageously empty directly or with only a slight bend in the transition area.

Figure 4:
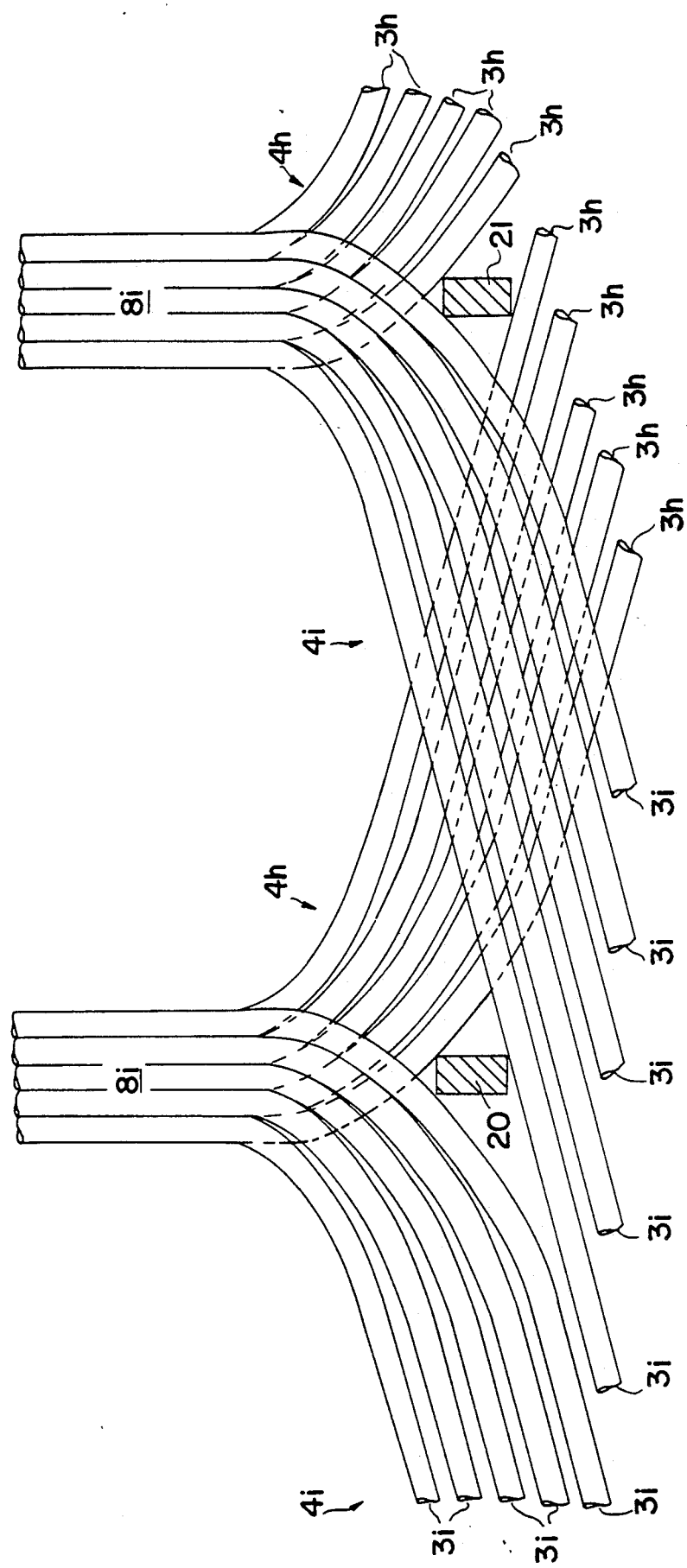
FIG. 4 is a partial section illustrating the point at which the tubes emerge from the coils and overlap one another in tube bundles.

FIG. 4 shows, in a detailed projection, the egress of tubes $3h$ and $3i$ at the top end of the coil. Represented in FIG. 4 is the arrangement of two adjacent top coils $4h$ and $4i$ that are usually coiled in opposite directions. The cut-away of FIG. 4 shows two adjacent groups of tubes 61 and 63 out of a total of eight groups of tube bundles or assemblies. Tubes $3h$ and $3i$ emerge from the coil directly above carriers 20 and 21 which are installed perpendicular to the drawing plane. After bending in the vertical direction, tubes $3h$ are covered by other tubes and only assemblies $8i$ and outer tube layer $4i$ can be seen. In another preferred embodiment, carriers are installed between the tubes of the vertically extending tube bundles $8i$. Spacers (not shown) may be attached to the carriers. The spacers are desirably parallel to the preferred vertical axis and extend between the tube coils to simultaneously absorb the various forces in the coils in the direction of the vertical axis.

Figure 5:
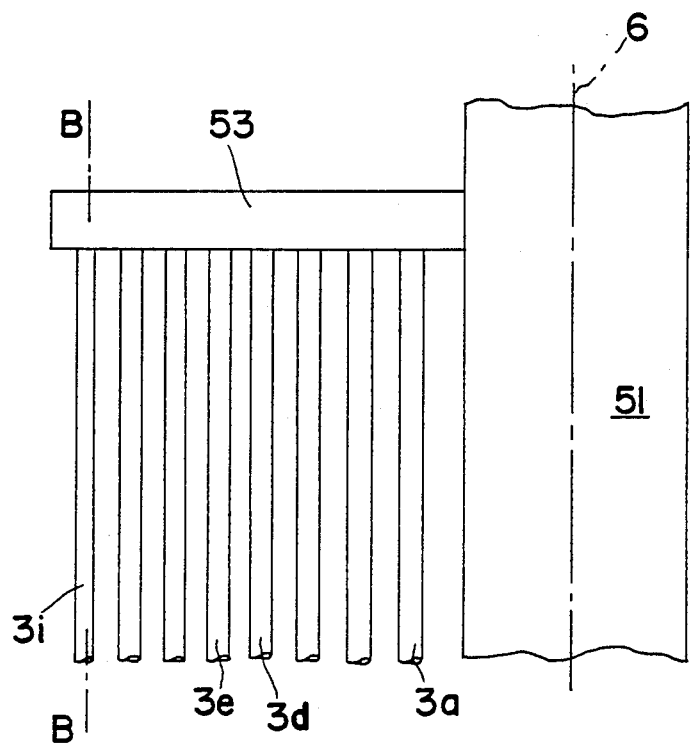
FIG. 5 is a sectional view of a preferred embodiment showing tube collectors with an initial collector.
Figure 6:
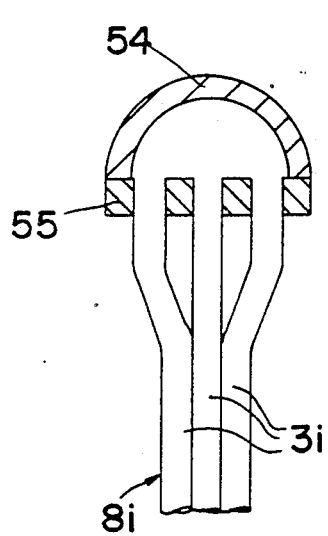
FIGS. 6 and 7 are cross-sectional views of different embodiments of initial collectors.
Figure 7:
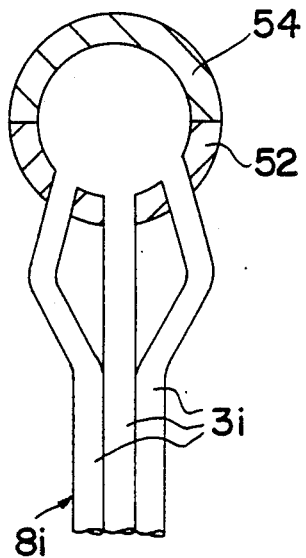

In another embodiment shown in FIGS. 5-7, the tubes are attached to the tube collector without any substantial bending. Instead of the horizontal and radial tube arrangement shown in FIGS. 1-3, the embodiment shown in FIGS. 5-7 uses an initial tube collector extending from the main tube collector. The tubes from one or more tube layers empty directly from below into the initial tube collector. FIG. 5 is a side view of such a tube collector with a central part 51 that is substantially cylindrically shaped around preferred axis 6, and an initial collector 53 that leads radially outwardly. Several such initial collectors are distributed about the periphery of the equipment, only one of which is shown in FIG. 5.

The tubes empty directly from below into initial collectors 53. The heat transport medium, such as, for example, cooling water, flows from tubes $3i$ through initial collector 53 into central part 51 of the tube collector. The constructional details of the tubes $3i$ of a tube bundle $8i$ are shown in FIG. 6. The initial collector 53, shown in FIG. 6, may be constructed from a half shell 54 and flat plate 55.

Another preferred embodiment uses a variant of the initial collector which is shown in FIG. 7. In this case, the initial collector consists of two half shells 54 and 52. FIGS. 6 and 7 each show three discharging pipes connected to the initial collector. Depending on the tube coil and the size of the equipment, a larger or smaller number of tubes from one tube coil can be run next to one another into an initial collector. Tubes $3i$ extend as shown in the projection (FIG. 4) below the section of the container illustrated in FIGS. 6 and 7.

Figure 8:
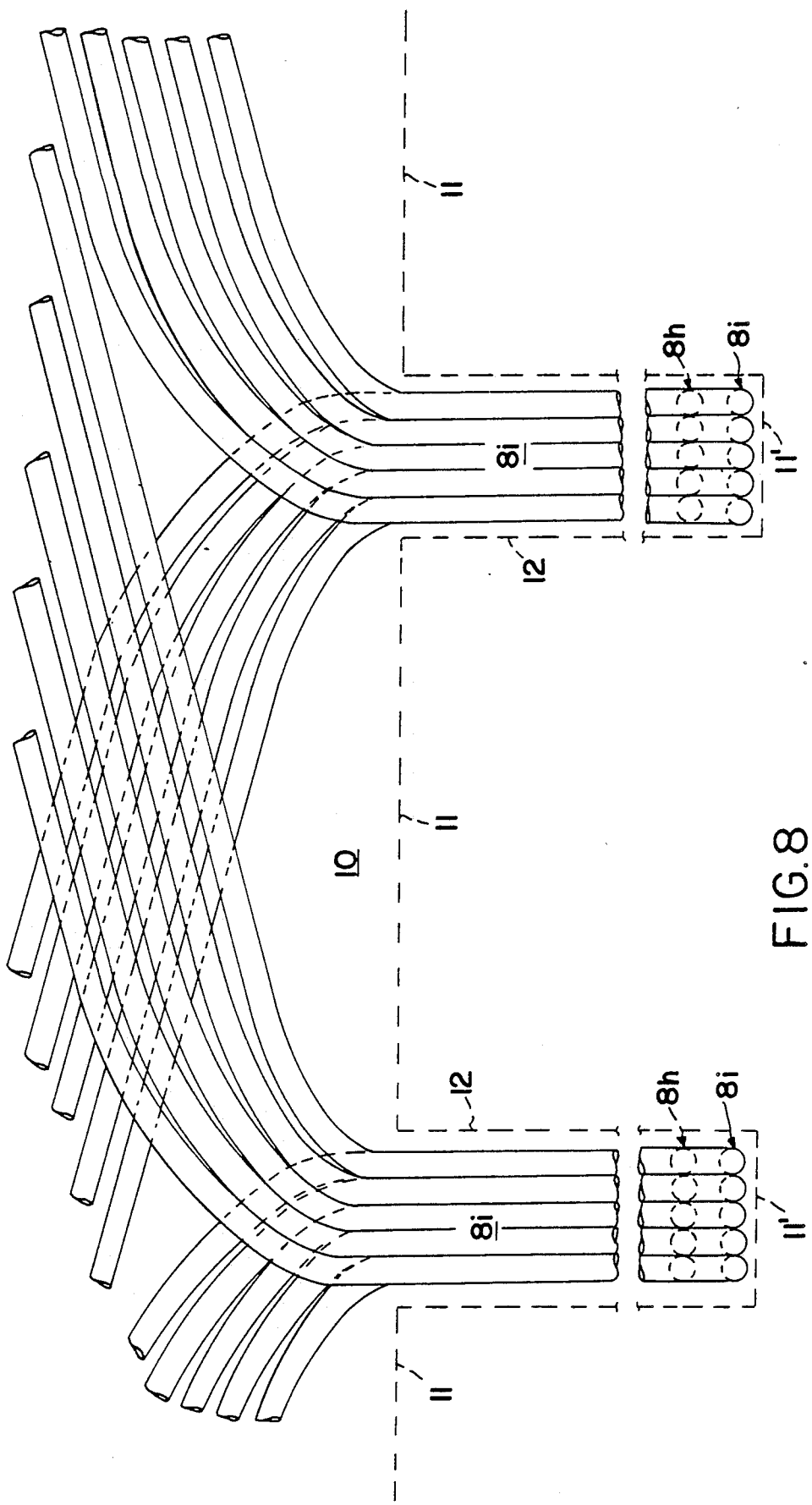
FIG. 8 is a partial sectional view showing the configuration of the end of tubes at the bottom end of the equipment with a retaining device.

FIG. 8 represents, in a projection, the bottom end of the equipment constructed according to the invention. FIG. 8 shows the positioning of a horizontal retaining device 11 for free-flowing granular material. Horizontal retaining device 11 may be constructed, for example, of a plurality of separately detachable perforated plates which may be hung on cross-pieces (not shown). To prevent the granular material from escaping between horizontal retaining device 11 and the tubes which extend below device 11, walls 12 are attached next to the tube assemblies $8h$ and $8i$. The walls 12 may, for example, be attached by tie rods (not shown) to each tube bundle. Further below, as shown in FIG. 8, the tubes bend 90° to the horizontal and perpendicular to the drawing plane. This is indicated on the lower edge of FIG. 8 by circles which represent the tube assemblies $8h$ and $8i$ of both tube coils $4h$ and $4i$. The retaining device has a horizontally attached to base 11' and front walls below horizontal section of the tube assemblies. The front walls can be attached to the side of tube assemblies $8i$ facing the observer (not shown). The parts of the retaining device which surround the group of tube assemblies may have openings 4.

Figure 9:
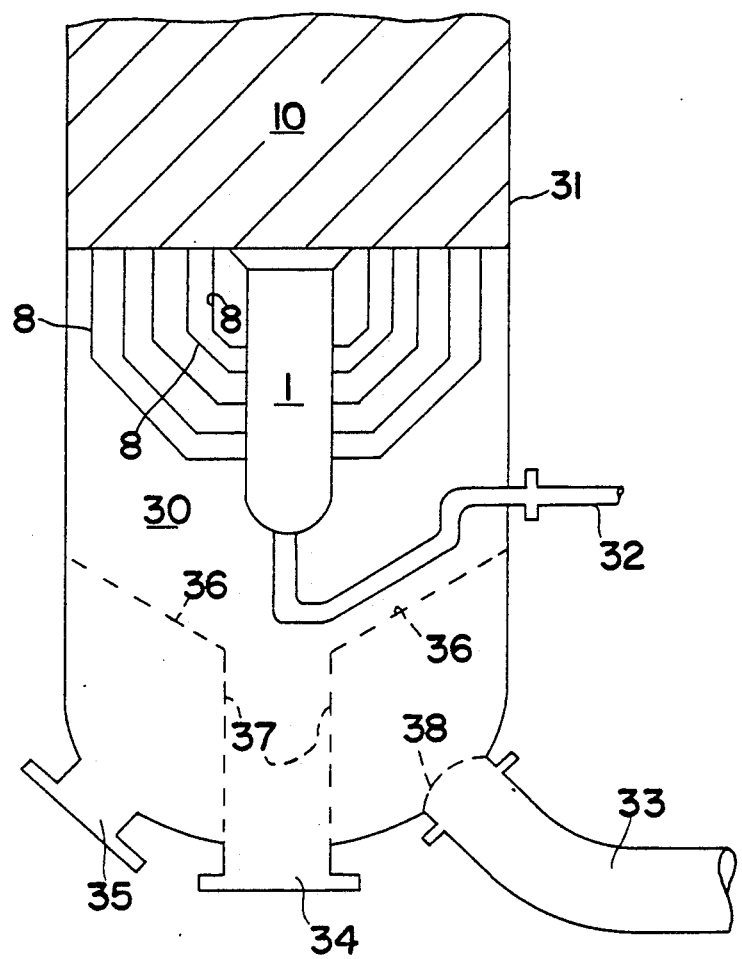
FIGS. 9 and 10 are side views in partial section of the bottom areas of two equipments constructed according to the invention which illustrate several ways in which free-flowing granular material in the bed can be drained from the equipment.

FIG. 9 shows the bottom section of heat transfer equipment having a bed 10 containing, for example, a catalytically active free-flowing granular material. Also illustrated is the outer wall 31, feed pipe 32 for the heat transfer medium, discharge pipe 33 for the substance to be treated, catalyst discharge outlet 34, and manhole 35. Tube assemblies 8 extend through space 30 below bed 10 as described above so that only portions of the bottom front surface of the coil are overlapped by tubes. The space 30 may be filled, for example, with inert particles.

In contrast to the embodiment represented in FIG. 8, the retaining device 36 shown in FIG. 9 is located below tube collector 1. The retaining device 36 (positioned centrally around the preferred axis) may be frustum shaped with a downward taper in the direction of the catalyst outlet 34. A wall 37 which is impermeable to catalyst material connects retaining device 36 and catalyst outlet 34.

If the equipment is to be emptied, generally a large portion of the free-flowing material in the bed flows out through catalyst outlet 34. In the equipment constructed according to the invention, service personnel can then enter into a protected working space 38 which is formed by outside wall 31, retaining device 36, and cylindrical wall 37. Service personnel can enter through catalyst outlet 34 into unprotected space 30 and can gain access to bed 10 either directly or through the retaining device.

Figure 10:
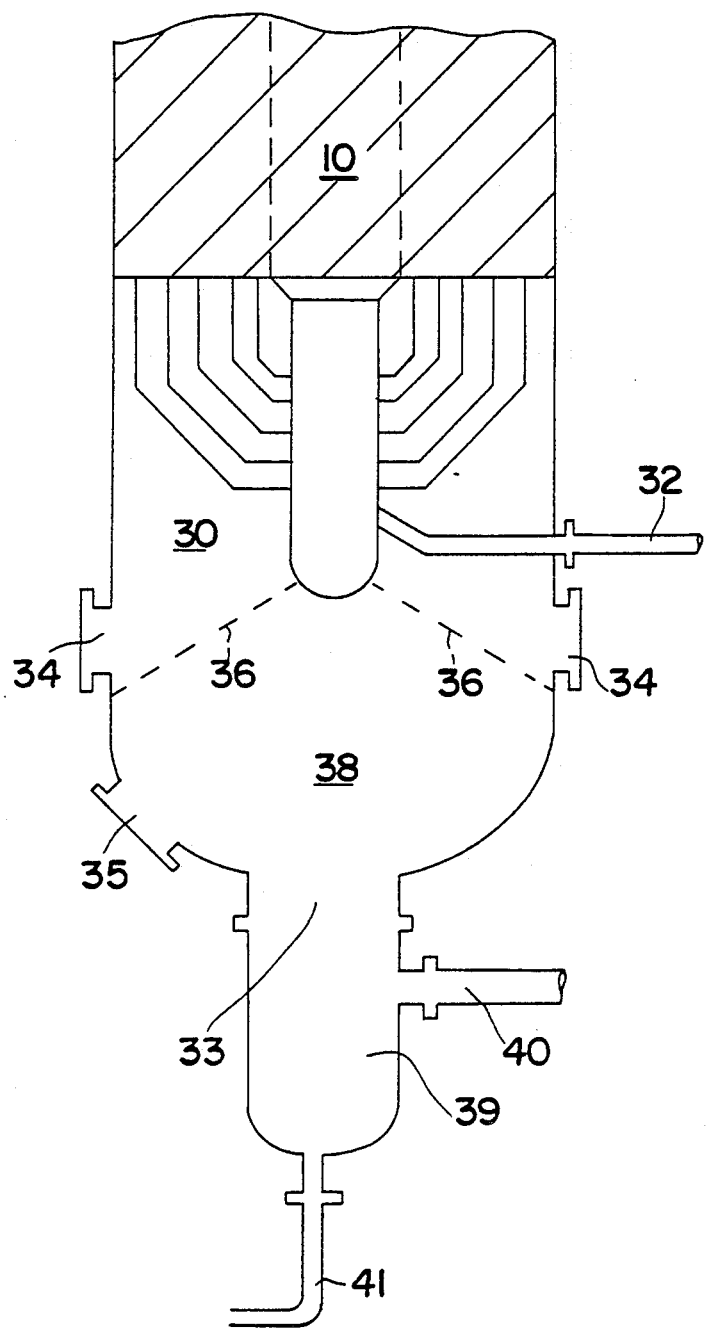

The embodiment of FIG. 10 is similar to that of FIG. 9 and therefore uses the same reference numerals for like parts. In FIG. 10, the frustum formed by retaining device 36 tapers upwardly. As a result, it is possible to place discharge pipe 33 for the material to be treated centrally to the preferred axis and at the lowest point in the equipment. In this embodiment, the material to be treated can be withdrawn during the operation if it is in liquid state. As shown in FIG. 10, separator 39 is combined with discharge line 33 in which draining fluid can be separated into a gaseous component removable through line 40, and a liquid component removable through line 41. The process of removing the granular material is accomplished similar to that described above with respect to FIG. 9. In the equipment shown in FIG. 10, personnel may enter unprotected space 30 by one of the catalyst discharge openings 34.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a device for performing chemical or adsorptive processes having a chamber adapted to contain a bed of free-flowing granular material, said chamber containing a plurality of spirally wound cylindrical tube coils which are spaced apart, nested together, and extend concentrically around a symmetry axis of the tube coils, each cylindrical tube coil being formed from a plurality of tube bundles which are spirally wound together in a substantially cylindrical configuration, each of the tube bundles containing a plurality of tubes, at least at one end of the coils the tube bundles which form a tube coil emerge from that coil at different defined spaced points around the circumference of the coil, adjacent tubes in a tube coil being spaced apart and the distance decreases between adjacent tubes in a tube bundle as the tube bundle emerges from a tube coil, said emerging tube bundle extending substantially parallel to said symmetry axis before it is connected to a collector, said emerging tube bundles being grouped closely together, whereby large areas at the end of the tube coils are left free of tube bundles.

2. The device of claim 1, wherein a frustrum-shaped retaining means extends across an end of the device to prevent the flow of granular material.

3. The device of claim 2, wherein the device is substantially vertical and the frustrum-shaped retaining means tapers upwardly connecting with a tube collector.

4. In a device for performing chemical or absorptive processes having a chamber adapted to contain a bed of free-flowing granular material, said chamber containing a plurality of spirally wound cylindrical tube coils which are spaced apart, nested together, and extend concentrically around a symmetrical axis of the tube coils, each cylindrical tube coil being formed from a plurality of tube bundles which are spirally wound together in a substantially cylindrical configuration, each of the tube bundles containing a plurality of tubes, at least at one end of the coil the tube bundles which form a tube coil emerge from the coil at different defined spaced points around the circumference of the coil, adjacent tubes in a tube coil being spaced apart and the distance decreases between adjacent tubes in a tube bundle as the tube bundle emerges from a tube coil, said emerging tube bundle extending substantially parallel to said symmetry axis and being connected to a plurality of initial tube collectors which extend radially from a main collector, said emerging tube bundles being grouped closely together whereby large areas at the end of the tube coils are left free of emerging tube bundles.

5. The device of claim 4, wherein the number of radially extending initial collectors corresponds to the number of tube bundles making up each tube coil.

6. The device of claim 4, wherein the tube bundles emerge at defined evenly spaced points on the circumference of the tube coils.

7. The device of claim 4, wherein a longitudinal axis of the main collector is on said symmetry axis.

8. The device of claim 4, wherein the device is substantially vertical, with the main collector extends vertically.

9. The device of claim 8, wherein tubes in the emerging tube bundles are spaced apart as they connect with the initial collector.

10. The device of claim 4, wherein the configuration of the tubes is substantially the same at both ends of the tube coils.

11. The device of claim 4, wherein the initial collector is cylindrical.

12. The device of claim 4, wherein the initial collector is semicircular in its cross-section.

13. The device of claim 12, wherein a perforated retaining means extends across an end of the device to prevent the flow of granular material, and the retaining means has a horizontal portion and another portion which surrounds the emerging tube bundles, whereby to prevent granular material from escaping between the retaining means and tubes which extend below the horizontal portion.

14. The device of claim 4, wherein the tubes in each tube bundle are spaced apart when they connect with the initial collector.

15. The device of claim 4, said large areas being of sufficient size to permit a worker to enter the chamber and clean the interior thereof.

16. The device of claim 4, containing said bed of free-flowing granular material.

17. In a device for performing chemical or adsorptive processes having a chamber adapted to contain a bed of free-flowing granular material, said chamber containing a plurality of spirally wound cylindrical tube coils which are spaced apart, nested together, and extend concentrically around a symmetrical axis of the tube coils, each cylindrical tube coil being formed from a plurality of tube bundles which are spirally wound together in a substantially cylindrical configuration, each of the tube bundles containing a plurality of tubes, at least at one end of the coil the tube bundles which form a tube coil emerge from that coil at different defined space points around the circumference of the coil, adjacent tubes in a tube coil being spaced apart and the distance decreases between adjacent tubes in a tube bundle as that tube bundle emerges from a tube coil, each emerging tube bundle extending substantially parallel to said symmetry axis and then having one or more bends to extend substantially radially and connecting with a tube collector, with the radially extending tube bundles from outer coils being radially superimposed on radially extending tube bundles from inner coils, said emerging tube bundles being grouped closely together whereby large areas at the end of the tube coils are left free of emerging tube bundles.

18. The device of claim 17, wherein the emerging tube bundles bend about 90° and extend essentially perpendicular to said symmetry axis.

19. The device of claim 28, wherein a longitudinal axis of the device is essentially vertical and coincides with the symmetry axis, and the collector is part of a steam collecting drum.

20. The device of claim 17, wherein perforated retaining means extends across and end of the device to prevent the flow of granular material.

21. The device of claim 20, wherein the retaining means comprises a support device and a screen or perforated plate attached to it, the openings in the screen or perforated plate being smaller than the particles of the free-flowing granular material.

22. The device of claim 20, wherein the retaining means encloses lowermost tubes in the device.

* * * * *